(12) United States Patent
Fukuda et al.

(10) Patent No.: US 7,951,505 B2
(45) Date of Patent: May 31, 2011

(54) FUEL CELL SYSTEM THAT SUPPLIES TO INDIVIDUAL CELLS OF A FUEL CELL STACK INDEPENDENTLY

(75) Inventors: Shinsuke Fukuda, Moriguchi (JP); Katsumi Kozu, Sanda (JP)

(73) Assignee: Panasonic Corporation, Osaka (JP)

( * ) Notice: Subject to any disclaimer, the term of this patent is extended or adjusted under 35 U.S.C. 154(b) by 854 days.

(21) Appl. No.: 11/114,173

(22) Filed: Apr. 26, 2005

(65) Prior Publication Data

US 2005/0238945 A1    Oct. 27, 2005

(30) Foreign Application Priority Data

Apr. 27, 2004  (JP) ................. 2004-131546
Apr. 28, 2004  (JP) ................. 2004-132782

(51) Int. Cl.
  *H01M 8/04*  (2006.01)
(52) U.S. Cl. ............ 429/513; 429/512; 429/514
(58) Field of Classification Search .......... 429/512–514
  See application file for complete search history.

(56) References Cited

U.S. PATENT DOCUMENTS

| | | | | |
|---|---|---|---|---|
| 2,745,350 | A | * | 5/1956 | Capsek .......... 417/269 |
| 3,468,713 | A | * | 9/1969 | Mueller .......... 429/14 |
| 3,850,695 | A | * | 11/1974 | Keller et al. .......... 429/432 |
| 3,917,531 | A |  | 11/1975 | Magnussen |
| 3,939,656 | A | * | 2/1976 | Goldfein .......... 60/381 |
| 3,960,598 | A |  | 6/1976 | Kohlmüller |
| 4,977,041 | A | * | 12/1990 | Shiozawa et al. .......... 429/26 |
| 5,147,736 | A | * | 9/1992 | Lapp .......... 429/27 |
| 5,486,430 | A | * | 1/1996 | Gorbell et al. .......... 429/35 |
| 5,527,634 | A | * | 6/1996 | Meacham .......... 429/35 |
| 5,723,228 | A |  | 3/1998 | Okamoto |
| 6,159,629 | A | * | 12/2000 | Gibb et al. .......... 429/39 |
| 6,280,867 | B1 |  | 8/2001 | Elias |
| 6,492,058 | B1 |  | 12/2002 | Watanabe et al. |
| 6,503,647 | B1 |  | 1/2003 | Sugiyama et al. |
| 6,861,821 | B2 |  | 3/2005 | Masumoto et al. |

(Continued)

FOREIGN PATENT DOCUMENTS

EP    0778631    6/1997

(Continued)

OTHER PUBLICATIONS

M. Richter et al., "A High performance Silicon Micropump for Fuel Handling in DMFC Systems", Fuel Cell Seminar, Nov. 3-7, proceedings, Miami Beach, FL, USA, 2003, pp. 272-275.*

(Continued)

*Primary Examiner* — Dah-Wei D Yuan
*Assistant Examiner* — Edu E Enin-Okut
(74) *Attorney, Agent, or Firm* — Greenblum & Bernstein, P.L.C.

(57) ABSTRACT

A fuel cell system including a fuel cell, constructed as an integrated stack comprising a laminate, produced by stacking a plurality of cells between two end plates, and a fuel supply device for supplying fuel to the fuel cell. In this fuel cell system, a plurality of individual fuel supply ports, for supplying fuel independently from the fuel supply device to each of the plurality of cells, are formed on the end plates, thus forming individual fuel supply channels that deliver fuel from the plurality of individual fuel supply ports to the fuel electrodes of the corresponding cells, respectively. This fuel cell system is compact, and enables equal supply of a predetermined quantity of fuel to each of the plurality of cells.

21 Claims, 8 Drawing Sheets

U.S. PATENT DOCUMENTS

| | | | |
|---|---|---|---|
| 2002/0187374 A1 | 12/2002 | Yamauchi et al. | |
| 2003/0003357 A1 | 1/2003 | Tamai et al. | |
| 2003/0134174 A1* | 7/2003 | Akikusa et al. | 429/38 |
| 2003/0180582 A1 | 9/2003 | Masumoto et al. | |
| 2004/0115507 A1* | 6/2004 | Potter et al. | 429/34 |
| 2005/0221159 A1* | 10/2005 | Harada et al. | 429/38 |
| 2007/0212588 A1* | 9/2007 | Kozu | 429/35 |

FOREIGN PATENT DOCUMENTS

| | | |
|---|---|---|
| JP | 64-72458 | 3/1989 |
| JP | 2-201071 | 8/1990 |
| JP | 2-127785 | 10/1990 |
| JP | 8-162078 | 6/1996 |
| JP | 2000-311667 | 11/2000 |
| JP | 2000-315483 | 11/2000 |
| JP | 2001-57205 | 2/2001 |
| JP | 2002-110121 | 4/2002 |
| JP | 2002-134077 | 5/2002 |
| JP | 2002-166447 | 6/2002 |
| JP | 2002-260609 | 9/2002 |
| JP | 2002-260710 | 9/2002 |
| JP | 2002-343407 | 11/2002 |
| JP | 2002-373630 | 12/2002 |
| JP | 2003-17022 | 1/2003 |
| JP | 2003-22789 | 1/2003 |
| JP | 2003-22830 | 1/2003 |
| JP | 2003-86159 | 3/2003 |
| JP | 2003-132860 | 5/2003 |
| JP | 2003-132861 | 5/2003 |
| JP | 2003-162987 | 6/2003 |
| JP | 2003-317753 | 11/2003 |
| JP | 2004-071415 | 3/2004 |
| JP | 2004071415 A * | 3/2004 |
| WO | WO 9811344 A2 * | 3/1998 |
| WO | WO 0140647 A1 * | 6/2001 |
| WO | 03/088398 | 10/2003 |

OTHER PUBLICATIONS

English Language Abstract of JP 2003-317753.
English Language Abstract of JP 2002-260710.
English Language Abstract of JP 2004-071415.
English language Abstract of JP 2003-132860, May 9, 2003.
English language Abstract of JP 2003-132861, May 9, 2003.
English language Abstract of JP 2000-315483, Nov. 14, 2000.
English language Abstract of JP 1-072458, Mar. 17, 1989.
English language Abstract of JP 8-162078, Jun. 21, 1996.
English language Abstract of JP 2002-260609, Sep. 13, 2002.
English language Abstract of JP 2003-22789, Jan. 24, 2003.
English language Abstract of JP 2002-110121, Apr. 12, 2002.
English language Abstract of JP 2003-17022, Jan. 17, 2003.
English language Abstract of JP 2002-373630, Dec. 26, 2002.
English language Abstract of JP 2003-86159, Mar. 20, 2003.
English language Abstract of JP 2003-162987, Jan. 6, 2003.
English language Abstract of JP 2000-311667, Nov. 7, 2000.
English language Abstract of JP 2001-57205, Feb. 27, 2001.
English language Abstract of JP 2002-166447, Jun. 11, 2002.
English language Abstract of JP 2002-134077, May 10, 2002.

* cited by examiner

FUEL CELL SYSTEM THAT SUPPLIES TO INDIVIDUAL CELLS OF A FUEL CELL STACK INDEPENDENTLY

The present disclosure relates to subject matter contained in priority Japanese Patent Application No. 2004-131546 filed on Apr. 27, 2004 and Japanese Patent Application No. 2004-132782 filed on Apr. 28, 2004, the contents of which is herein expressly incorporated by reference in its entirety.

BACKGROUND OF THE INVENTION

1. Field of the Invention

The present invention relates to a comparatively small fuel cell system that is ideal as a power source for portable electronic device and the like.

2. Description of the Related Art

The basic structure of a fuel cell comprises an electrolyte layer sandwiched between a fuel electrode and an air electrode, and a direct current is generated by an electrochemical reaction caused by supplying hydrogen to the fuel electrode and oxygen to the air electrode. Because the electromotive force of a single cell, which represents the smallest unit capable of generating a current, is small, a plurality of cells must be connected in series to enable the fuel cell system to provide adequate voltage to function as the power source for a device. Therefore, the plurality of cells are stacked to form a stack configuration. The level of current that can be drawn from a fuel cell can be increased by increasing the reaction surface area. However, because the power sources for portable electronic device and the like must be kept compact, a structure in which the fuel can be supplied smoothly and efficiently to each cell is necessary to enable a vigorous, large volume reaction to occur within a limited reaction surface area.

The most common method of supplying fuel to each of the cells within the aforementioned stack employs a fuel circulation system in which fuel is supplied in series to the plurality of cells within the stack, and the fuel discharged from the stack is circulated and resupplied to the system. For example, in one known system, unreacted hydrogen within the fuel that has circulated through the plurality of cells within the stack and then been discharged is merged with the fuel supply channel (see Japanese Patent Laid-Open Publication No. 2003-317753). In a fuel cell that uses this type of fuel circulation system, a single pump is sufficient for supplying the fuel. However, in this type of fuel circulation system, because the fuel concentration decreases with increasing distance along the fuel supply route, and the concentration of the resupplied fuel also falls, an auxiliary device such as a fuel concentration regulator must be provided. In comparatively large fuel cells, the pump performance can be increased, and the installation of a large pump and/or an auxiliary device presents no particular problems, but this solution is unsuitable for compact fuel cells designed for use within portable device equipment and the like.

Furthermore, in order to prevent a downstream decrease in the fuel concentration within a fuel cell employing a fuel circulation system, a system has been proposed in which the cross-sectional area of the fuel channel is increased within the downstream cells, thereby increasing the fuel flow rate, and equalizing the current density distribution across each of the cells (see Japanese Patent Laid-Open Publication No. 2002-260710). However, in order to enable the supply of an equal concentration of fuel to each of the plurality of cells that form the stack, this system preferably requires an independent fuel supply to each cell. However, in order to ensure the precise supply of a prescribed quantity of fuel to each cell, a single fuel supply port must be provided for each of the plurality of cells. Unfortunately in compact fuel cells designed for use within portable electronic device, the provision of an individual fuel supply port for each cell is problematic.

One fuel supply system that has been adapted for compact fuel cells is a non-circulating fuel system in which only the precise quantity of fuel required for power generation is supplied to each of the plurality of cells. However, when fuel supply is conducted using such a non-circulating fuel system, in order to ensure the precise supply of a prescribed quantity of fuel to each cell, a single fuel supply port must be provided for each of the plurality of cells, with fuel supply then occurring from each of these supply ports. Possible means for supplying fuel to a plurality of fuel supply ports include providing a fuel supply device at each fuel supply port, or providing a single fuel supply device and then distributing the fuel from this single device to each of the fuel supply ports. Providing an individual fuel supply device at each fuel supply port ensures excellent precision of the fuel supply, but the volume occupied by the fuel supply devices is considerable, making such a system impractical for compact fuel cells. On the other hand, in a system in which a single fuel supply device is provided, and the fuel from this single device is then distributed to each of the fuel supply ports, precise control of the fuel supply volume is impossible.

SUMMARY OF THE INVENTION

An object of the present invention is to provide a fuel cell system which comprises a fuel cell and a fuel supply device, and enables precise supply of a predetermined quantity of fuel to each of a plurality of cells.

In order to achieve the above object, a fuel cell system of a first aspect of the present invention comprises a fuel cell and a fuel supply device, in which the fuel cell comprises a plurality of cells stacked together in a stack, wherein an individual fuel supply port for supplying fuel from the fuel supply device is provided in each of the plurality of cells. By employing this configuration, an equal concentration of fuel is supplied to each cell, and the fuel supply to each cell is controlled independently. This means the fuel supply is conducted with high precision, and the quantity of power generated by each cell is equalized, thus enabling a more stable fuel cell output.

A fuel cell system of a second aspect of the present invention comprises a fuel cell and a fuel supply device, in which the fuel cell is an integrated stack comprising a laminate, produced by stacking a plurality of cells, sandwiched between two end plates, wherein a plurality of individual fuel supply ports, for supplying fuel independently from the fuel supply device to each of the plurality of cells, are formed on the end plates, thus forming an individual fuel supply channel that delivers fuel from each of the plurality of individual fuel supply ports to a fuel electrode of the corresponding cell. By employing this configuration, because an individual fuel supply channel to each cell is formed from one of the plurality of individual fuel supply ports provided on the sandwiching end plates, the thickness of the separators partitioning the plurality of cells is reduced, thus enabling the production of a thinner stack, and a more compact fuel cell system that is ideally suited to portable electronic equipment and the like.

Furthermore, the fuel supply device within the above fuel cell system comprises a plurality of pump means, which correspond with the plurality of individual cells. Each of the pump means is driven by drive means, and draws fuel in through an inlet, and then discharges the fuel through an outlet and supplies it to the corresponding cell. By employing this configuration, not only fuel is supplied precisely and equally to each individual cell, but the fuel supply to each cell is controlled independently. Furthermore, if a configuration is used in which a single drive means is used to drive a plurality of pump means, then the device is further reduced in size, thus providing a fuel cell system that is ideal for portable electronic equipment.

While novel features of the invention are set forth in the preceding, the invention, both as to organization and content, can be further understood and appreciated, along with other objects and features thereof, from the following detailed description and examples when taken in conjunction with the attached drawings.

DETAILED DESCRIPTION OF THE PREFERRED EMBODIMENTS

As follows is a description of a fuel cell of a fuel cell system according to the present invention, with reference to FIG. 1 through FIG. 6. The following description focuses on the application of the present invention to a direct methanol fuel cell (DMFC) that uses an aqueous solution of methanol as fuel, but the fuel cell system may also be applied to all manner of other fuel cells.

Figure 6:
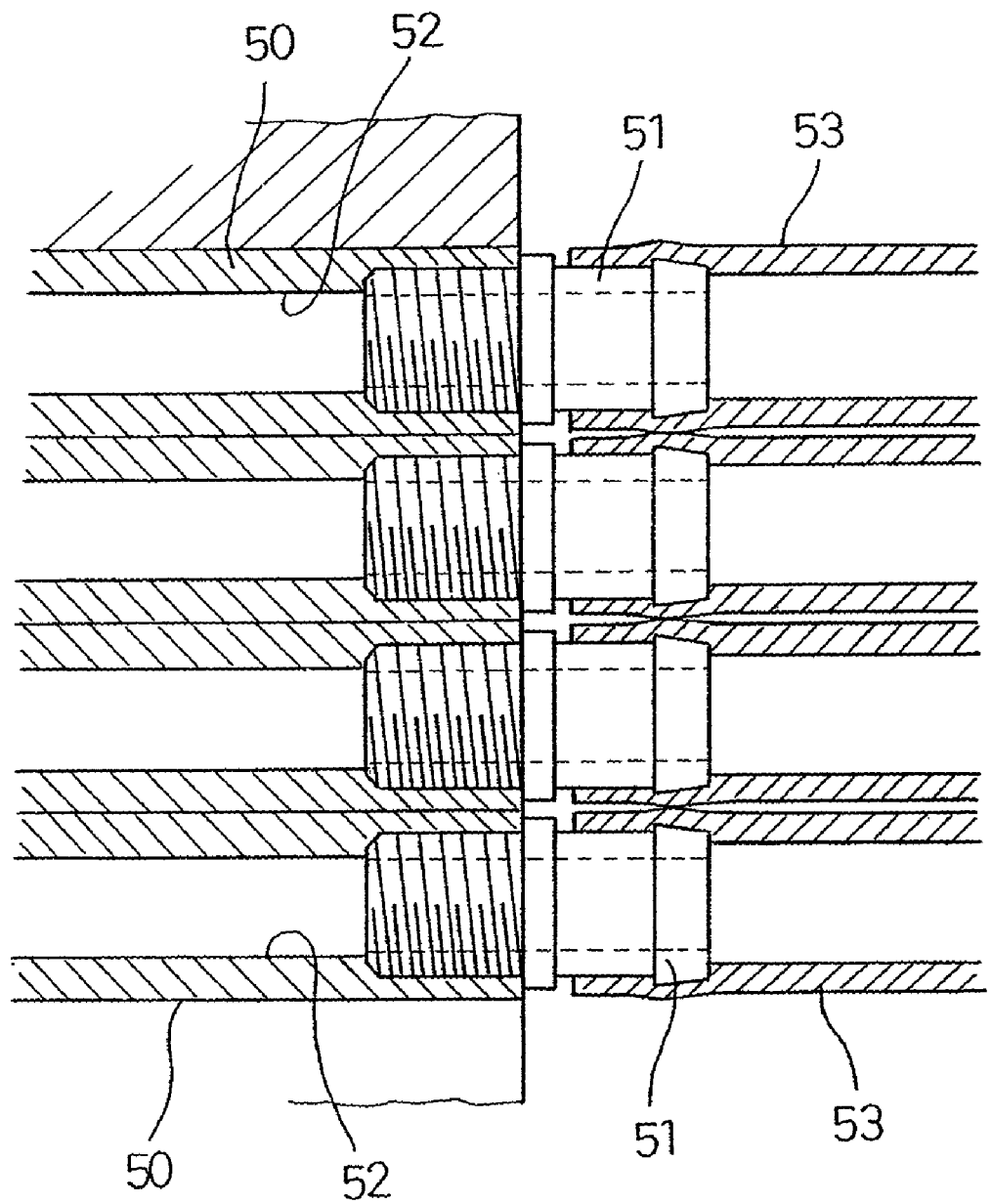
FIG. 6 is a cross-sectional view showing the basic construction for fuel supply to individual cells.

In a stacked fuel cell comprising a plurality of stacked cells, in order to enable individual fuel supply to each cell, a construction such as that shown in FIG. 6 is used. Namely, a tube joint 51 that functions as a fuel supply port is provided between the side surfaces of adjacent separators 50, a plurality of which are used to partition the plurality of cells, so that a fuel supply channel 52 that interconnects with the tube joint 51 is formed between the separators 50. The fuel supplied from a tube 53 connected to the tube joint 51 is supplied to the fuel electrode of a membrane electrode assembly (MEA) disposed between the separators 50.

In order to reduce the size of the fuel cell, the thickness of the separators 50 must be reduced, but in the structure described above, because the tube joint 51 is fitted to the side surfaces of the separators 50, namely the surfaces that contribute to the separator thickness, the thickness of the separators 50 cannot be reduced below the inner diameter of the tube 53 connected to the tube joint 51. The inner diameter of the tube 53 must be sufficient to enable the prescribed volume of fuel to be supplied to the MEA. If the diameter is reduced beyond this value, then the power consumption of the fuel pump supplying the fuel increases, and because a portion of the fuel cell power output is consumed by this fuel pump, the total output of the fuel cell system decreases. In a comparatively large fuel cell, the thickness of the separators 50 can be set to a dimension that corresponds with an inner diameter for the tube 53 that enables the desired fuel flow rate. However, in the type of compact fuel cell for portable electronic device targeted by the present invention, forming the separators 50 with sufficient thickness to enable satisfactory fuel supply tends to inhibit any reductions in the size of the system. In the fuel cell described below, this problem is overcome, and a structure is provided that enables the individual supply of a predetermined, equal quantity of fuel to each of a plurality of cells, even for a fuel cell of reduced size.

Figure 1:
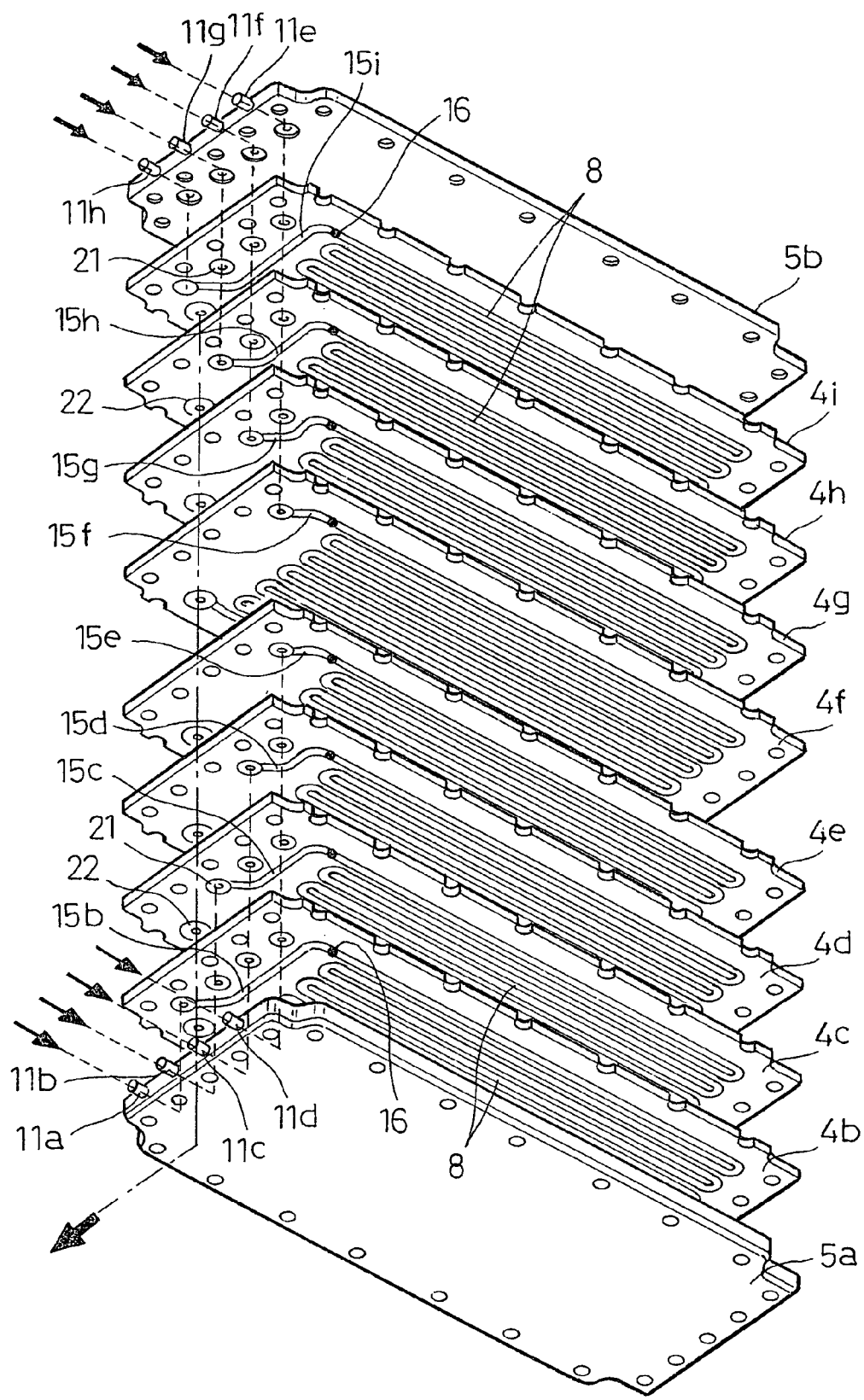
FIG. 1 is a perspective view showing the configuration of fuel supply channels in fuel cells according to an embodiment of the present invention.
Figure 2:
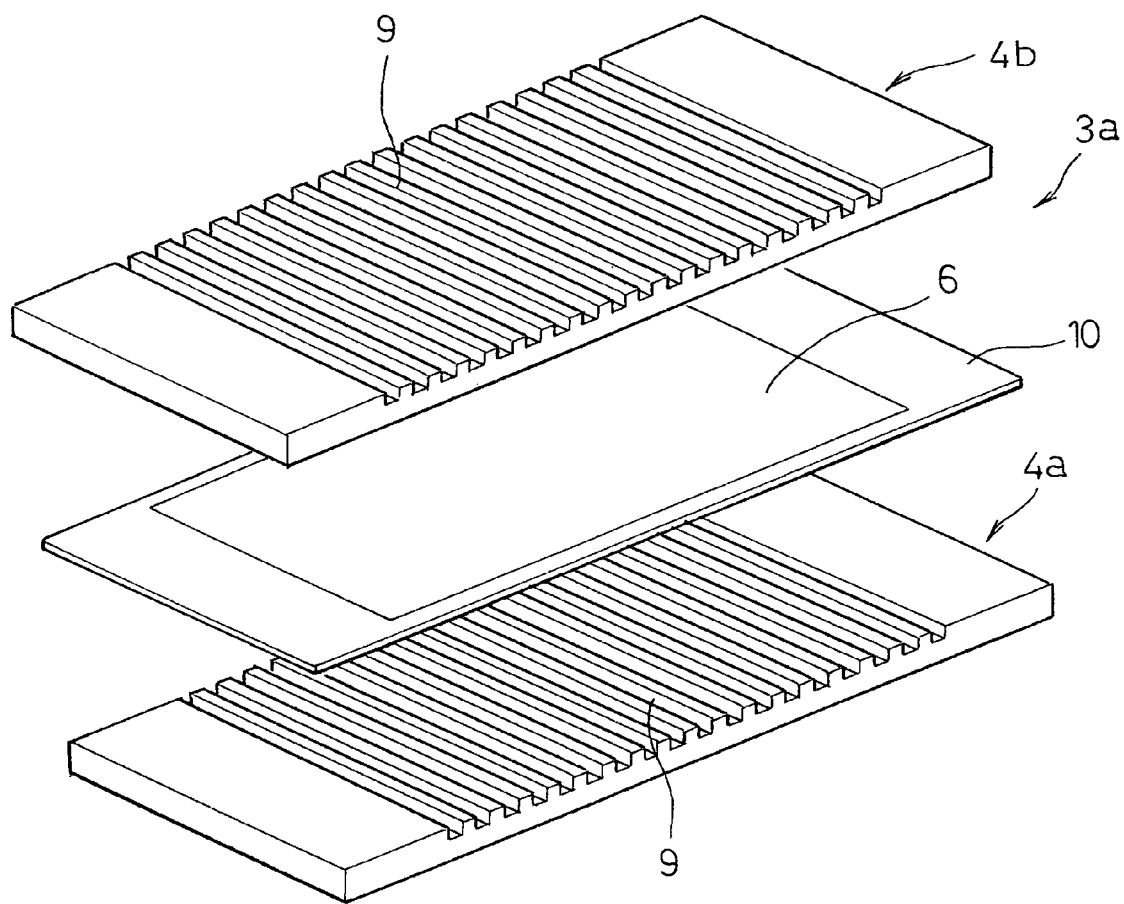
FIG. 2 is a perspective view showing the structure of a cell within the fuel cell according to the embodiment.
Figure 3:
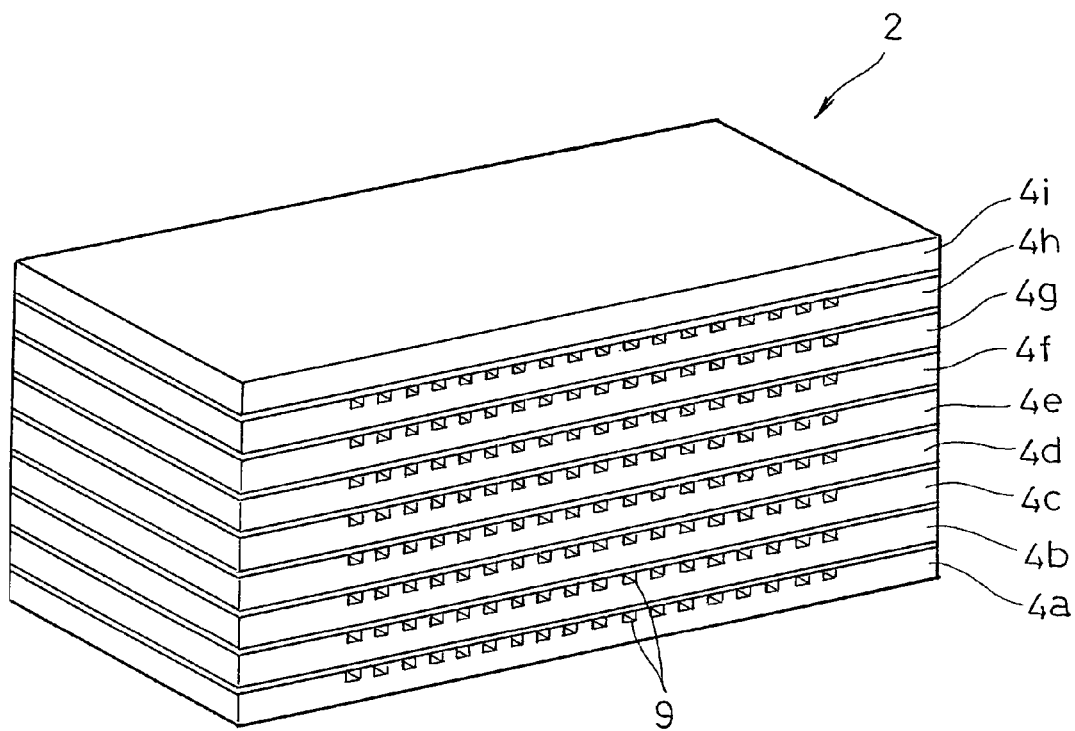
FIG. 3 is a perspective view showing a stack in which a plurality of cells are stacked together.

FIG. 1 shows the channels for fuel supply and fuel discharge that represent the characteristic feature of a fuel cell according to an embodiment of the present invention. The fuel cell of this embodiment is formed as a stack 1 (described later) comprising a plurality of stacked cells 3. The stack 1 comprises a laminate of eight individual cells 3, each of which comprises a MEA 6 sandwiched between two separators 4a and 4b as shown in FIG. 2, integrated into a single unit by sandwiching the cells between two end plates 5a and 5b. The MEA 6 comprises a fuel electrode on one surface of a polymer membrane that functions as the electrolyte, and an air electrode on the other surface, and is affixed to a sealing rubber 10 and then disposed between the separators 4a and 4b. In a cell 3a, fuel is supplied along the fuel electrode from a fuel channel 8 (see FIG. 1) formed in one direction within the opposing surface of the separator 4b, whereas air is supplied along the air electrode from an air channel 9 formed in the opposing surface of the separator 4a. The hydrogen within the fuel and the oxygen in the air then react via the membrane, generating an electromotive force between the fuel electrode and the air electrode. Eight cells 3a to 3h constructed in this manner are stacked together, with the MEAs 6 sandwiched between separators 4a to 4i, thus forming a stacked cells 2 shown in FIG. 3.

Figure 4:
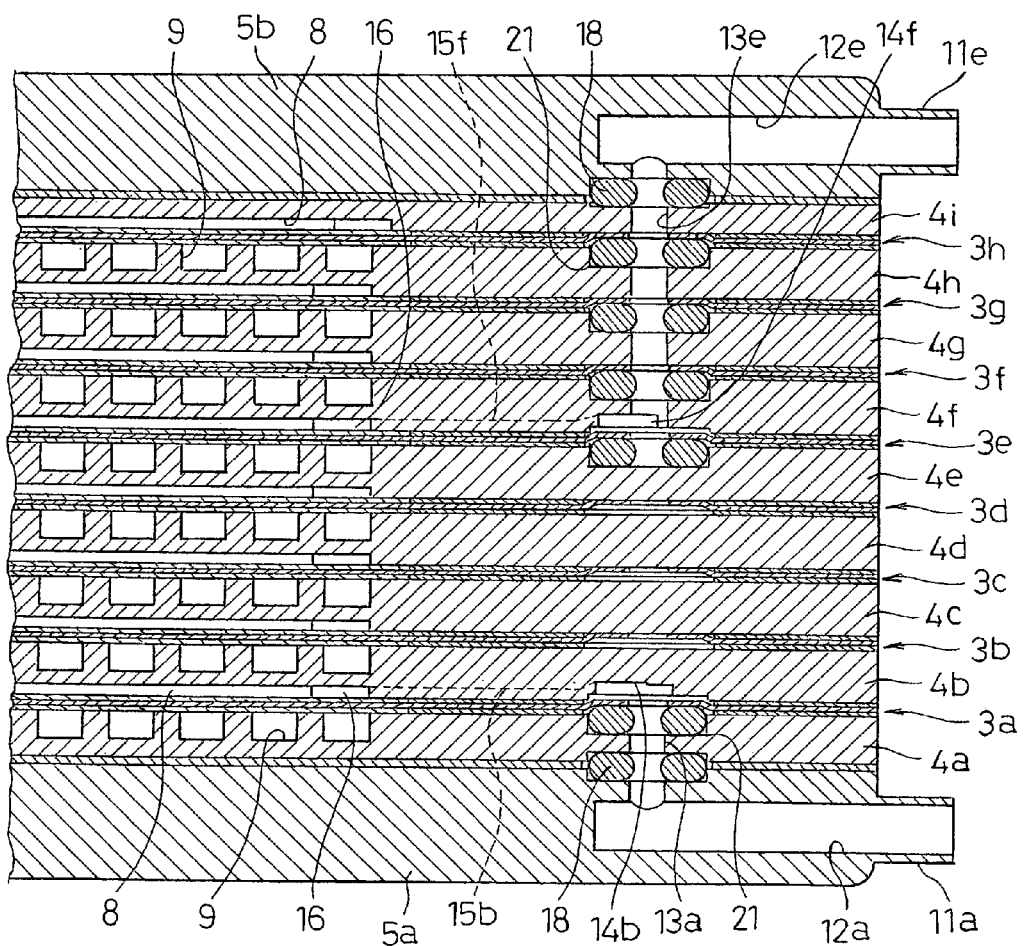
FIG. 4 is a cross-sectional view showing a fuel supply channel formed within separators.

As shown in FIG. 1 and FIG. 4, on the bottom end plate 5a are provided four individual fuel supply ports 11a to 11d for supplying fuel individually to the fuel channels 8 of the four cells 3a to 3d on that side of the structure. Similarly, on the top end plate 5b are provided four further individual fuel supply ports 11e to 11h for supplying fuel individually to the four cells 3e to 3h on the other side of the structure. A tube is connected to each of these individual fuel supply ports 11a to 11h, and these are connected by piping to a fuel discharge port 34 of a fuel supply device 31 or 32 described below. Fuel supplied from the tubes connected to the individual fuel supply ports 11a to 11h is guided from individual fuel supply channels 12a to 12h, formed through the thickness of the end plates 5a and 5b, to individual fuel inlet holes 13a to 13h formed in the stacking direction of the cells 3a to 3h, and is then supplied to the fuel channels 8 within the separators 4b to 4i that correspond with the cells 3a to 3h that represent the fuel supply destination. In FIG. 1, the separator 4a in which no fuel channel 8 is formed is omitted.

FIG. 4 shows the fuel supply route to the fuel channel 8 of the separator 4b corresponding with the cell 3a, and the fuel supply route for the fuel channel 8 of the separator 4f corresponding with the cell 3e. As shown in this example, fuel is supplied individually to each of the cells 3a to 3h, either from an individual fuel inlet hole 13a to 13e, provided through any lower separators 4a to 4e, to a predetermined separator 4b to 4e, or from an individual fuel inlet hole 13e to 13i, provided through any upper separators 4e to 4i, to a predetermined separator 4e to 4i. The individual fuel inlet holes 13a to 13h penetrate as far as the predetermined separator 4a to 4i that supplies fuel to the supply destination cell 3a to 3h, and leakage of fuel from the channel is prevented by O-rings 18 engaged within respective concave portions 21 around the supply holes.

Next is a description of the fuel flow through the fuel supply routes corresponding with the cells 3a and 3e shown in FIG. 4. In the case of the cell 3a, fuel that enters the individual fuel supply port 11a passes from the individual fuel supply channel 12a, through the individual fuel inlet hole 13a that penetrates the separator 4a, and enters an individual fuel inlet 14b formed in the separator 4b. The fuel then flows through an individual fuel guide channel 15b formed in the separator 4b, and reaches a power generation start point 16 at the inlet to the fuel channel 8. The fuel that flows into the fuel channel 8 from the power generation start point 16 is supplied to the fuel electrode of the MEA 6 of the cell 3a, and contributes to power generation. The fuel then flows through to a power generation end point 17 at a fuel channel outlet shown in FIG. 5, flows into a fuel discharge hole 19, and is discharged externally from a fuel discharge port 20 provided in the end plate 5a.

In the case of the cell 3e, fuel that enters the individual fuel supply port 11e passes from the individual fuel supply channel 12e, through the individual fuel inlet hole 13e that penetrates the separators 4i, 4h, 4g, and 4f, and enters an individual fuel inlet 14f formed in the separator 4f. The fuel then flows through an individual fuel guide channel 15f formed in the separator 4f, and reaches a power generation start point 16 at the inlet to the fuel channel 8. The fuel that flows into the fuel channel 8 from the power generation start point 16 is supplied to the fuel electrode of the MEA 6 of the cell 3e, and contributes to power generation. The fuel then flows through to a power generation end point 17 at a fuel channel outlet shown in FIG. 5, flows into the fuel discharge hole 19, and is discharged externally from the fuel discharge port 20 provided in the end plate 5a.

The same fuel supply process is used for the cells 3a to 3h, and the channels from the individual fuel supply ports 11a to 11h through to the power generation start points 16 of the respective cells 3a to 3h are all formed with the same volumetric capacity. In other words, the system is constructed so that the combined total of the channel capacity of the individual fuel inlet hole 13a to 13h, and the channel capacity of the corresponding individual fuel guide channel 15b to 15i, formed in the separator 4b to 4i between the individual fuel inlet 14b to 14h shown in FIG. 1 and the power generation start point 16, is equal for each cell 3a to 3h. Accordingly, fuel fed into the individual fuel supply ports 11a to 11h reaches the power generation start points 16 of the cells 3a to 3h almost simultaneously, meaning power generation with the cells 3a to 3h also occurs simultaneously. This enables greater stability of the power generation performance of the stack 1 comprising the eight cells 3a to 3h connected in series.

Figure 5:
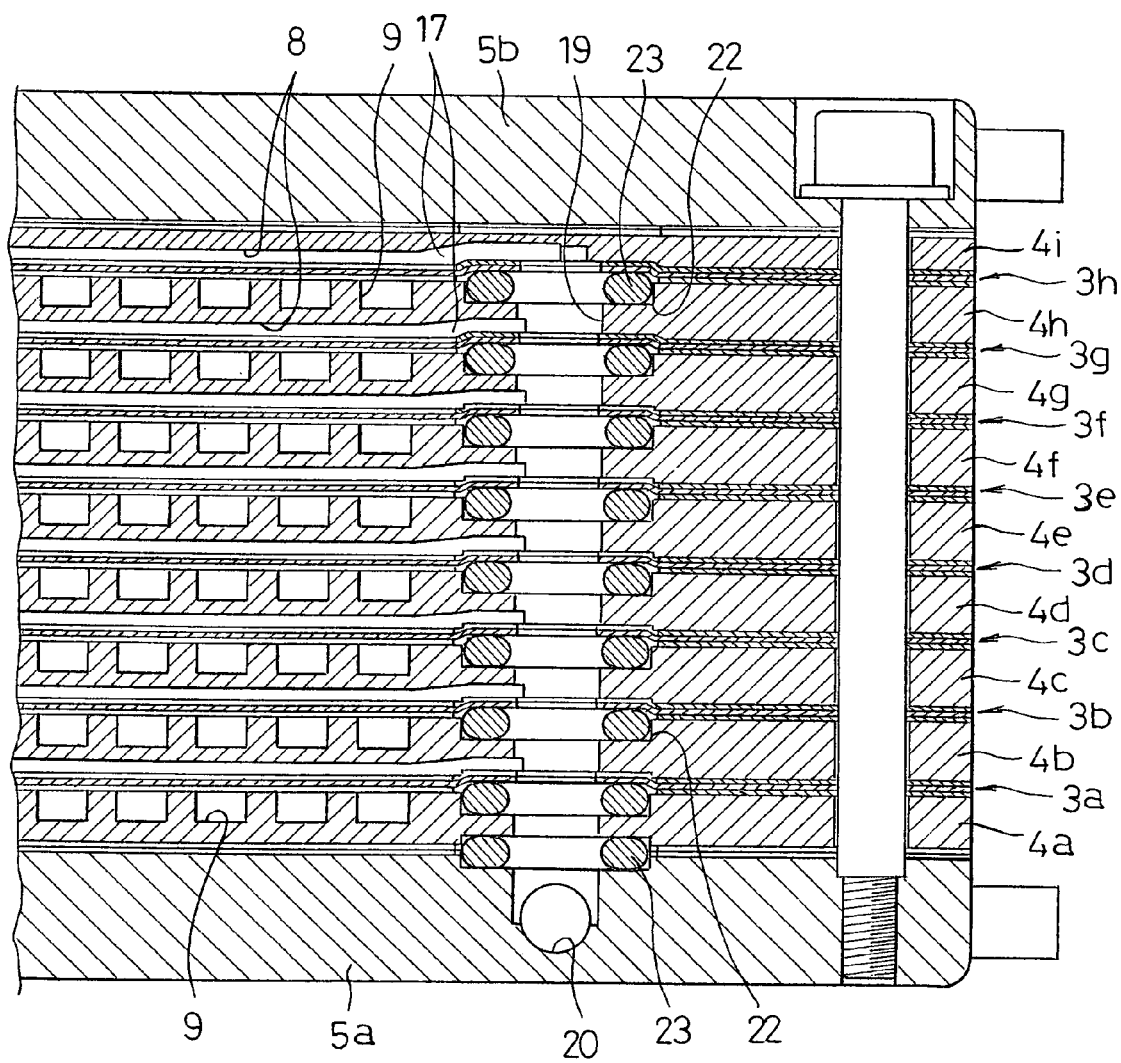
FIG. 5 is a cross-sectional view showing a fuel discharge channel formed within separators.

The fuel that has flowed through the fuel channels 8 of the respective separators 4b to 4i and supplied hydrogen to the respective fuel electrodes reaches the respective power generation end points 17 of the fuel channels 8 shown in FIG. 5. The fuel then flows from these power generation end points 17 down through the fuel discharge hole 19, which penetrates through the thickness direction of the separators 4a to 4i, and is discharged externally from the fuel discharge port 20 provided in the end plate 5a. Leakage of fuel from the fuel discharge hole 19 is prevented by O-rings 23 engaged within discharge concave portions 22, which are formed around the fuel discharge hole 19 in each of the separators 4a to 4h.

In the above configuration, the fuel supply channels for the cells 3a to 3h are formed with equal channel capacity between the individual fuel supply port 11a to 11h and the start point 16 of the corresponding fuel channel 8, and the fuel channels 8 are formed equally for each cell. As a result, by supplying an equal quantity of fuel to each of the individual fuel supply ports 11a to 11h, the quantity of power generated by each cell 3a to 3h is held constant, enabling good stability of the desired output level.

Figure 7:
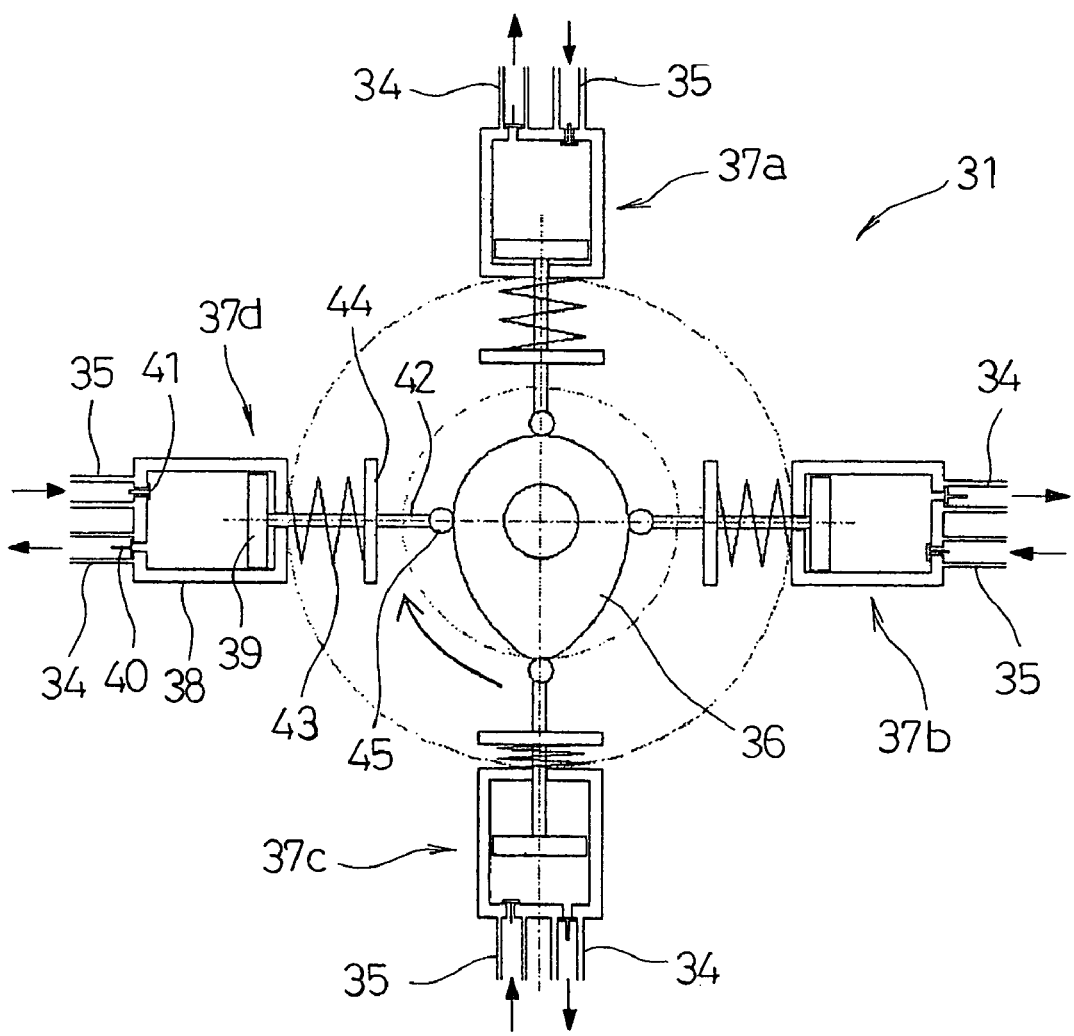
FIG. 7 is a cross-sectional view showing the structure of a fuel supply device according to a first example.
Figure 8:
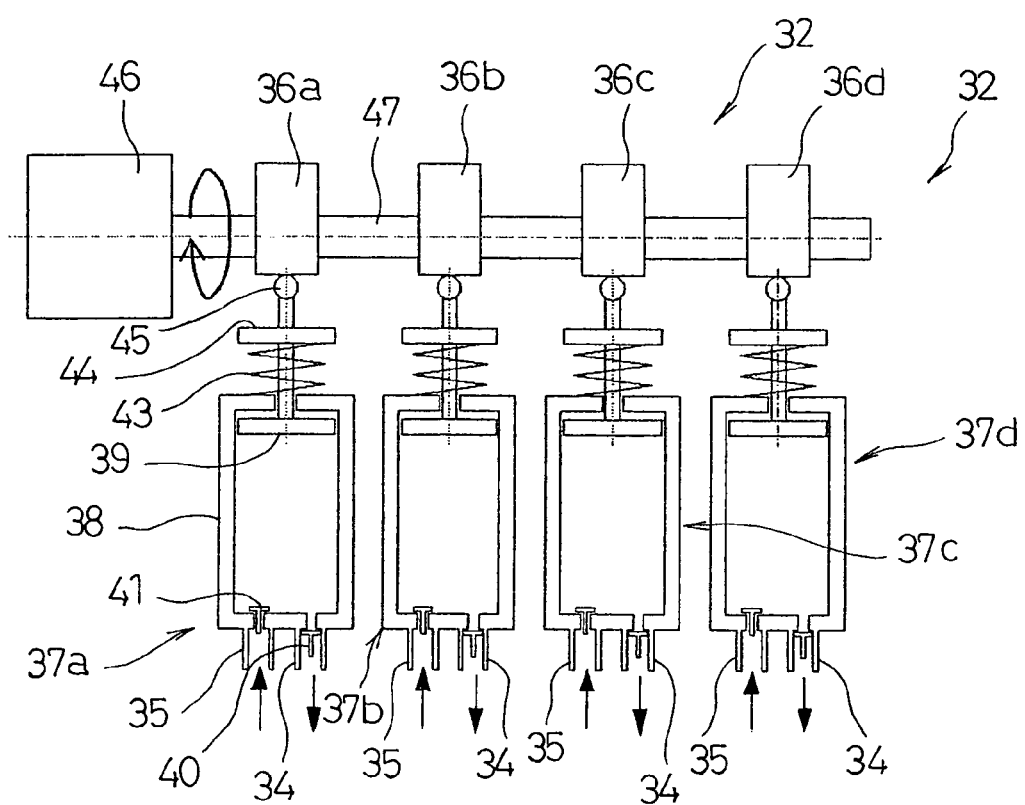
FIG. 8 is a cross-sectional view showing the structure of a fuel supply device according to a second example.

Next is a description of a fuel supply device for forming a fuel cell system according to the present invention, with reference to FIG. 7 and FIG. 8.

FIG. 7 shows the structure of a fuel supply device 31 according to a first example. In this example, a cam (drive body) 36, which is rotated by a motor not shown in the figure, causes sequential discharge operations within four pumps 37a to 37d. Each pump 37a to 37d comprises a cylinder 38, provided with a discharge valve 40 that opens towards the aforementioned fuel discharge port 34, and an inlet valve 41 that opens towards a fuel inlet port 35. A piston 39 is housed inside the cylinder 38, and is able to move freely back and forth inside the cylinder. A suction spring 43, disposed between the cylinder 38 and a spring bearing 44 fixed to a piston rod 42, keeps the piston 39 in a retracted state, and this causes an active end roller 45 on the piston rod 42 to contact the outside surface of the cam 36.

When the force of the suction spring 43 causes the piston 39 to retract, the resulting negative pressure opens the inlet valve 41, and fuel is suctioned into the cylinder 38 from a fuel tank (not shown in the figure) connected to the fuel inlet port 35. When the rotation of the cam 36 brings the protruding portion of the cam to a position where it pushes out on the active end roller 45, then as shown by the state of the pump 37c in the figure, the piston rod 42 is pushed in against the resistance of the suction spring 43, causing the piston 39 to advance. This compresses the fuel that has been suctioned into the cylinder 38, thereby opening the discharge valve 40, and causing a quantity of fuel corresponding with the distance of the advance of the piston 39 to be discharged through the fuel discharge port 34. This discharged fuel is supplied to one of the individual fuel supply ports 11a to 11h through a connecting tube (not shown in the figure).

The fuel supply device 31 shown in FIG. 7 comprises four pumps 37a to 37d, whereas the number of corresponding individual fuel supply ports 11a to 11h is eight. Accordingly, by providing two of these fuel supply devices 31, individual fuel supply is conducted to each of the eight cells 3a to 3h. Eight pumps could also be positioned around the periphery of a single cam 36, but this requires a considerable increase in the size of the fuel supply device 31, which is undesirable in the construction of compact fuel cells for use within portable electronic equipment and the like. A preferred option is to use the fuel supply device 31 with four pumps 37 described in the example above, and then increase the number of these devices in accordance with the number of cells.

FIG. 8 shows the structure of a fuel supply device 32 according to a second example. In this example, four cams 36a to 36d, which are attached to a rotating shaft 47 that is rotated by a motor 46, are positioned above four pumps 37a to 37d that are aligned in parallel along a straight line. In the structure shown, the attachment angle is the same for all of the cams 36a to 36d, so that fuel suction and fuel discharge occurs simultaneously within the four pumps 37a to 37d. Alternatively, the attachment angle of each cam 36a to 36d to the rotating shaft 47 could also be varied, so that fuel supply occurs sequentially from each of the pumps 37a to 37d.

The fuel supplied to each of the individual fuel supply ports 11a to 11h from the fuel discharge port 40 of an aforementioned fuel supply device 31 or 32 is guided from the individual fuel supply channels 12a to 12h formed through the thickness of the end plates 5a and 5b to the individual fuel inlet holes 13a to 13h formed in the stacking direction of the cells 3a to 3h. From here, the fuel is supplied to the fuel channels 8 within the separators 4b to 4i that correspond with the cells 3a to 3h that represent the fuel supply destination.

The fuel supply devices 31 and 32 described above both employ pumps 37a to 37d that rely on back and forth movement of a piston 39, but the devices could also use rotary type pumps.

As described above, a fuel cell and fuel supply device according to the present invention enable the precise supply of a predetermined quantity of fuel to each of a plurality of cells, and also enable control of the fuel supply to each cell. As a result, it is possible to provide a fuel cell system which enables reductions in the size and weight of a stack comprising a plurality of stacked cells, and is compact enough to be used as the power source for portable electronic equipment and the like.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A fuel cell system comprising a fuel cell and a fuel supply device having a plurality of pumps, wherein:
   the fuel cell is an integrated stack comprising a laminate, produced by stacking a plurality of cells;
   two end plates sandwich the fuel cell in a direction of cell stacking;
   a plurality of individual fuel supply ports, that supply fuel independently from the fuel supply device and individually connect to each of the plurality of cells, are formed on the end plates;
   each of the individual fuel supply ports supply fuel from a single pump of the fuel supply device to a single one of the cells;
   individual fuel supply channels are provided that deliver fuel from each of the plurality of individual fuel supply ports to fuel electrodes of corresponding cells;
   the individual fuel supply channels are disposed so that they do not communicate with each other; and
   the number of cells in the fuel cell is equal to the number of pumps in the fuel supply device.

2. The fuel cell system according to claim 1, wherein at least one of the plurality of individual fuel supply ports is formed on one of the end plates and at least one other of the plurality of individual fuel supply ports is formed on the other end plate.

3. The fuel cell system according to claim 1, wherein each individual fuel supply channel comprises:
   an individual fuel inlet hole, which passes through one or more separators of the cells, in a direction of cell stacking, from an end plate to a separator corresponding to a destination cell;
   an individual fuel guide channel which is formed in the separator corresponding to the destination cell from the individual fuel inlet hole to a start point of a fuel channel; and
   a fuel channel which is formed in a region of the separator corresponding to the destination cell that opposes the fuel electrode.

4. The fuel cell system according to claim 1, wherein a fuel discharge channel is formed between an end point of a fuel channel of each of the cells, and a fuel discharge port provided in one of the end plates.

5. The fuel cell system according to claim 4, wherein the end points of the fuel channels, and the fuel discharge port are formed along a straight line that penetrates through in a direction of cell stacking.

6. The fuel cell system according to claim 1, wherein:
   each of the plurality of pumps correspond to one of the plurality of individual cells; and
   each of the pumps is driven by a driver, and draws fuel in through an inlet, and then discharges the fuel through an outlet and supplies it to the corresponding cell.

7. The fuel cell system according to claim 1, wherein a volumetric capacity of a fuel supply route, from each of the individual fuel supply ports to a start point of a fuel channel for supplying fuel to a fuel electrode, is constant across the plurality of cells.

8. The fuel cell system according to claim 2, wherein a volumetric capacity of a fuel supply route, from each of the individual fuel supply ports to a start point of a fuel channel for supplying fuel to a fuel electrode, is constant across the plurality of cells.

9. The fuel cell system according to claim 3, wherein a volumetric capacity of a fuel supply route, from each of the individual fuel supply ports to a start point of a fuel channel for supplying fuel to a fuel electrode, is constant across the plurality of cells.

10. The fuel cell system according to claim 6, wherein the plurality of pumps are disposed annularly around a periphery of a drive body, and the drive body is rotated by the driver and drives each of the pumps.

11. The fuel cell system according to claim 6, wherein the plurality of pumps are disposed in parallel along a straight line of a drive body which is rotated by the driver and drives each of the pumps.

12. The fuel cell system according to claim 6, wherein a volume of a single discharge from a discharge port of a pump is a constant volume.

13. A fuel cell system comprising a fuel cell and a fuel supply device, wherein:
   the fuel cell is an integrated stack comprising a laminate, produced by stacking a plurality of cells;
   two end plates sandwich the fuel cell in a direction of cell stacking;
   a plurality of individual fuel supply ports, that supply fuel independently from the fuel supply device and individually connect to each of the plurality of cells, are formed on the end plates;
   individual fuel supply channels are provided that deliver fuel from each of the plurality of individual fuel supply ports to fuel electrodes of corresponding cells;
   the individual fuel supply channels are disposed so that they do not communicate with each other;
   the fuel supply device comprises a plurality of pumps which correspond to the plurality of individual cells;
   each of the individual fuel supply ports supply fuel from a single pump of the fuel supply device to a single one of the cells;
   each of the pumps is driven by a driver, and draws fuel in through an inlet, and then discharges the fuel through an outlet and supplies it to the corresponding cell; and
   the number of pumps driven by the driver is a divisor of the number of cells.

14. The fuel cell system according to claim 13, wherein the plurality of individual fuel supply ports are connected to the end plates.

15. The fuel cell system according to claim 13, wherein each individual fuel supply channel comprises:

an individual fuel inlet hole, which passes through one or more separators of the cells, in a direction of cell stacking, from an end plate to a separator corresponding to a destination cell;

an individual fuel guide channel which is formed in the separator corresponding to the destination cell from the individual fuel inlet hole to a start point of a fuel channel; and a fuel channel which is formed in a region of the separator corresponding to the destination cell that opposes the fuel electrode.

16. The fuel cell system according to claim 13, wherein a fuel discharge channel is formed between an end point of a fuel channel of each of the cells, and a fuel discharge port provided in one of the end plates.

17. The fuel cell system according to claim 16, wherein the end points of the fuel channels, and the fuel discharge port are formed along a straight line that penetrates through in a direction of cell stacking.

18. The fuel cell system according to claim 13, wherein a volumetric capacity of a fuel supply route, from each of the individual fuel supply ports to a start point of a fuel channel for supplying fuel to a fuel electrode, is constant across the plurality of cells.

19. The fuel cell system according to claim 13, wherein the plurality of pumps are disposed annularly around a periphery of a drive body, and the drive body is rotated by the driver and drives each of the pumps.

20. The fuel cell system according to claim 13, wherein the plurality of pumps are disposed in parallel along a straight line of a drive body which is rotated by the driver and drives each of the pumps.

21. The fuel cell system according to claim 13, wherein a volume of a single discharge from a discharge port of a pump is a constant volume.

* * * * *

UNITED STATES PATENT AND TRADEMARK OFFICE
CERTIFICATE OF CORRECTION

| | | |
|---|---|---|
| PATENT NO. | : 7,951,505 B2 | Page 1 of 1 |
| APPLICATION NO. | : 11/114173 | |
| DATED | : May 31, 2011 | |
| INVENTOR(S) | : S. Fukuda et al. | |

It is certified that error appears in the above-identified patent and that said Letters Patent is hereby corrected as shown below:

On the Cover Page, at Item (54) Title, of the printed patent, "FUEL CELL SYSTEM THAT SUPPLIES TO INDIVIDUAL CELLS OF A FUEL CELL STACK INDEPENDENTLY" should read --FUEL CELL SYSTEM THAT SUPPLIES FUEL TO INDIVIDUAL CELLS OF A FUEL CELL STACK INDEPENDENTLY--.

On the Cover Page, at Item (75) Inventors, of the printed patent, "Moriguchi" should read --Osaka--.

On the Cover Page, at Item (75) Inventors, of the printed patent, "Sanda" should read --Hyogo--.

On the Cover Page, at Item (56) References Cited, under U.S. PATENT DOCUMENTS, of the printed patent, insert --5,358,799 A    10/1994    Gardner    429/26--.

On the Cover Page, at Item (56) References Cited, under U.S. PATENT DOCUMENTS, of the printed patent, insert --5,316,747 A    5/1994    Pow et al.    423/247--.

Signed and Sealed this
Twenty-third Day of August, 2011

David J. Kappos
*Director of the United States Patent and Trademark Office*

UNITED STATES PATENT AND TRADEMARK OFFICE
CERTIFICATE OF CORRECTION

PATENT NO.       : 7,951,505 B2                                             Page 1 of 1
APPLICATION NO.  : 11/114173
DATED            : May 31, 2011
INVENTOR(S)      : S. Fukuda et al.

It is certified that error appears in the above-identified patent and that said Letters Patent is hereby corrected as shown below:

On the Cover Page, at Item (54) and at Column 1, lines 1-3, Title, of the printed patent, "FUEL CELL SYSTEM THAT SUPPLIES TO INDIVIDUAL CELLS OF A FUEL CELL STACK INDEPENDENTLY" should read --FUEL CELL SYSTEM THAT SUPPLIES FUEL TO INDIVIDUAL CELLS OF A FUEL CELL STACK INDEPENDENTLY--.

On the Cover Page, at Item (75) Inventors, of the printed patent, "Moriguchi" should read --Osaka--.

On the Cover Page, at Item (75) Inventors, of the printed patent, "Sanda" should read --Hyogo--.

On the Cover Page, at Item (56) References Cited, under U.S. PATENT DOCUMENTS, of the printed patent, insert --5,358,799 A    10/1994    Gardner    429/26--.

On the Cover Page, at Item (56) References Cited, under U.S. PATENT DOCUMENTS, of the printed patent, insert --5,316,747 A    5/1994    Pow et al.    423/247--.

This certificate supersedes the Certificate of Correction issued August 23, 2011.

Signed and Sealed this
Thirteenth Day of September, 2011

David J. Kappos
*Director of the United States Patent and Trademark Office*